US010204453B2

(12) United States Patent
Sharma

(10) Patent No.: US 10,204,453 B2
(45) Date of Patent: Feb. 12, 2019

(54) AVIATION MASK

(71) Applicant: AIRBUS GROUP INDIA PRIVATE LIMITED, Bangalore (IN)

(72) Inventor: Anurag Sharma, Bangalore (IN)

(73) Assignee: AIRBUS GROUP INDIA PRIVATE LIMITED, Bangalore, Karnataka (IN)

(*) Notice: Subject to any disclaimer, the term of this patent is extended or adjusted under 35 U.S.C. 154(b) by 116 days.

(21) Appl. No.: 15/244,018

(22) Filed: Aug. 23, 2016

(65) Prior Publication Data
US 2017/0069136 A1    Mar. 9, 2017

(30) Foreign Application Priority Data

Sep. 4, 2015  (IN) .......................... 4701/CHE/2015

(51) Int. Cl.
*A62B 18/02* (2006.01)
*G06F 3/01* (2006.01)
*G06T 19/00* (2011.01)
*G02B 27/01* (2006.01)
*G02B 27/00* (2006.01)

(52) U.S. Cl.
CPC ............ *G06T 19/006* (2013.01); *A62B 18/02* (2013.01); *G02B 27/0093* (2013.01); *G02B 27/017* (2013.01); *G06F 3/013* (2013.01); *B64D 2231/025* (2013.01)

(58) Field of Classification Search
CPC ....... G06T 19/006; G06F 3/013; A62B 18/02; G02B 27/0093; G02B 27/017; B64D 2231/025; G09B 5/06; G09B 9/24; G09B 9/302

USPC ............................................. 345/633; 434/38
See application file for complete search history.

(56) References Cited

U.S. PATENT DOCUMENTS

| 4,832,287 A * | 5/1989 | Werjefelt .................. B60R 1/00 244/118.5 |
| 7,525,448 B1 * | 4/2009 | Wilson .................... G02B 27/01 340/461 |
| 9,581,819 B1 * | 2/2017 | Boggs ................ G02B 27/0172 |
| 2003/0201911 A1 * | 10/2003 | Kennedy .............. G01C 23/005 340/980 |
| 2010/0001928 A1 * | 1/2010 | Nutaro ................. G02B 27/017 345/8 |

(Continued)

*Primary Examiner* — Jin Cheng Wang
(74) *Attorney, Agent, or Firm* — Prakash Nama; Global IP Services, PLLC

(57) ABSTRACT

An aviation mask is disclosed which includes an augmented reality visor, sensors, and a display computational unit. The sensors are communicatively connected to the augmented reality visor. The sensors detect a portion of a cockpit area of an aircraft that is viewed by an aircraft crew member wearing the augmented reality visor during a vision obscured emergency. The display computational unit is communicatively connected to the augmented reality visor and the sensors. The display computational unit projects a prestored image associated with the portion of the cockpit area in front of the augmented reality visor. Further, the display computational unit superimposes the prestored image over the portion of the cockpit area viewed by the aircraft crew member. The superimposed prestored image being viewed by the aircraft crew member through the augmented reality visor to identify objects in the portion of the cockpit area during the vision obscured emergency.

21 Claims, 4 Drawing Sheets

(56) References Cited

U.S. PATENT DOCUMENTS

| | | | | |
|---|---|---|---|---|
| 2011/0001796 A1* | 1/2011 | Werjefelt | ............... | B64D 43/00 348/47 |
| 2012/0249592 A1* | 10/2012 | Sanders-Reed | ...... | G01C 23/005 345/633 |
| 2013/0155093 A1* | 6/2013 | He | ....................... | G01C 23/005 345/592 |
| 2013/0345929 A1* | 12/2013 | Bowden | .................... | B60R 1/00 701/36 |
| 2014/0266985 A1* | 9/2014 | Harrison | .................. | G09G 3/20 345/8 |
| 2014/0333510 A1* | 11/2014 | Wischmeyer | .......... | B64D 43/00 345/8 |
| 2015/0138235 A1* | 5/2015 | Cho | ........................ | G02B 5/10 345/633 |
| 2015/0151838 A1* | 6/2015 | Kerns | .................... | B64D 25/00 345/633 |
| 2015/0261379 A1* | 9/2015 | Kneuper | .............. | G08G 5/0052 345/173 |
| 2015/0281596 A1* | 10/2015 | Reed | ...................... | H04N 5/265 348/231.99 |
| 2015/0338237 A1* | 11/2015 | Bonamy | .............. | G01C 23/005 340/973 |
| 2016/0019808 A1* | 1/2016 | Chavez | .................. | G09B 9/302 434/38 |
| 2016/0027312 A1* | 1/2016 | Kneuper | .............. | G08G 5/0008 701/120 |
| 2016/0048725 A1* | 2/2016 | Holz | ....................... | G01P 13/00 345/156 |
| 2016/0093230 A1* | 3/2016 | Boggs | .................... | G09B 9/307 434/38 |
| 2016/0110919 A1* | 4/2016 | Hancock | .............. | G06T 19/006 345/428 |
| 2016/0347473 A1* | 12/2016 | Khatwa | ................ | B60T 8/1703 |

* cited by examiner

AVIATION MASK

RELATED APPLICATIONS

Benefit is claimed under 35 U.S.C. 119(a)-(d) to Foreign Application Serial No. 4701/CHE/2015 filed in India entitled "AVIATION MASK", filed on Sep. 4, 2015 by AIRBUS GROUP INDIA PRIVATE LIMITED which is herein incorporated in its entirety by reference for all purposes.

A reference is made to an Indian Application Number 2778/CHE/2015 filed on Jun. 2, 2015 and entitled "respiratory masks for use in aircrafts."

TECHNICAL FIELD

Embodiments of the present subject matter generally relate to an aviation mask, and more particularly, to the aviation mask for use during vision obscured emergencies.

BACKGROUND

Cockpits of air crafts may suffer from several dangerous and catastrophic emergencies. Moreover, among these emergencies, vision obscured emergencies may occur which may cause vision impairment to aircraft crew members in the cockpit. The vision obscured emergencies may be caused by several factors, such as fumes, smoke, mist, leakage of toxic liquid of wipers, smoke due to avionics fire, smoke due to electrical short circuits, fumes or smokes due to engine failure, and the like. During such vision obscured emergencies, an aircraft crew member, for example a pilot, may wear a mask to facilitate respiration and to protect eyes from smokes, fumes, toxic liquids, and or irritants. However, the aircraft crew member when wearing the mask under these conditions may not be able to clearly see control panel located in the cockpit area. Further in such conditions when wearing the mask, the aircraft crew member may not be able to get a good view of objects located outside the aircraft, especially through a windshield of the aircraft. Furthermore, due to the poor visibility inside the cockpit, the aircraft crew member may inadvertently actuate an undesired switch control while operating the aircraft for controlling the aircraft during such vision obscured emergencies.

SUMMARY

In one embodiment, an aviation mask is disclosed. The aviation mask includes an augmented reality visor, sensors, and a display computational unit. The sensors are communicatively connected to the augmented reality visor. The sensors detect a portion of a cockpit area of an aircraft that is viewed by an aircraft crew member wearing the augmented reality visor during a vision obscured emergency. The display computational unit is communicatively connected to the augmented reality visor and the sensors. The display computational unit projects a prestored image associated with the portion of the cockpit area in front of the augmented reality visor. Further, the display computational unit superimposes the prestored image over the portion of the cockpit area viewed by the aircraft crew member. The superimposed prestored image being viewed by the aircraft crew member through the augmented reality visor to identify objects in the portion of the cockpit area during the vision obscured emergency.

In another embodiment, a method for identifying objects inside a cockpit area of an aircraft during a vision obscured emergency is disclosed A portion of the cockpit area viewed by an aircraft crew member wearing an augmented reality visor during the vision obscured emergency is detected. Further, a prestored image associated with the portion of the cockpit area is projected in front of the augmented reality visor. Furthermore, the prestored image is superimposed over the portion of the cockpit area viewed by the aircraft crew member. The superimposed prestored image being viewed by the aircraft crew member through the augmented reality visor to identify one or more objects in the portion of the cockpit area during the vision obscured emergency.

The aviation mask disclosed herein may be implemented in any means for achieving various aspects. Other features will be apparent from the accompanying drawings and from the detailed description that follow.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

In the following detailed description of the embodiments of the present subject matter, references are made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not, to be taken in a limiting sense, and the scope of the present subject matter is defined by the appended claims.

Generally, head-up displays (HUDs) are used for displaying information associated with electronic flight instruments during normal operating conditions. However, such HUDs may not be useful during the vision obscured emergencies. For example, the vision obscured emergencies (e.g., presence of smoke/fumes/fog in the cockpit area) can cause visual disturbances in the cockpit area and may restrict the aircraft crew member to view and identify control switches inside the cockpit area.

Figure 1:
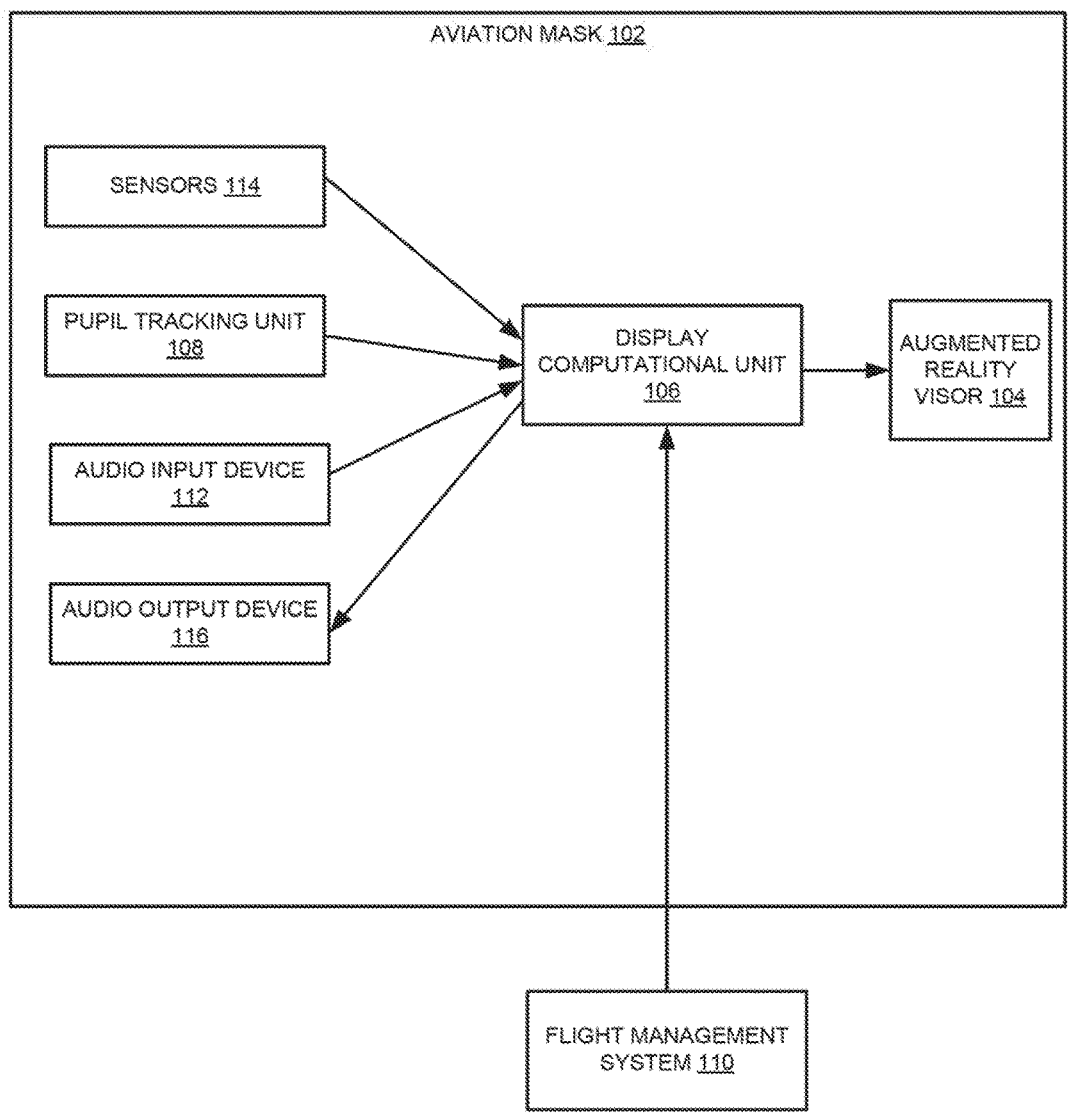
FIG. 1 is a block diagram illustrating an aviation mask including components and the connectivity with a flight management system, in accordance with an embodiment.

FIG. 1 is a block diagram 100 showing an aviation mask 102 including components and the connectivity with a flight management system 110, according to an embodiment. In one example, the aviation mask 102 may be used in vision obscured emergencies. The vision obscured emergencies may, for example, refer to emergency conditions inside the aircraft because of which the aircraft crew member may not be able to see the objects inside the aircraft. The aviation mask 102 may be used by a pilot or other crew members, such as cabin crew, for identifying the objects in the aircraft during the vision obscured emergencies. The vision obscured emergency may be detected using sensors. In one example, the sensors may be smoke sensors to sense smoke in the aircraft for detecting the vision obscured emergency. Other types of sensors may also be used for sensing conditions inside the aircraft that can lead to the vision obscured emergency, for example a fog sensor may be used to sense fog inside the aircraft. In one example, the aviation mask 102 may include an augmented reality visor 104, sensors 114 for detecting a portion of a cockpit area, and a display computational unit 106. The portion may refer to panels, along with other components, located in the cockpit area of the aircraft Example sensors 114 may be infra red cameras, magnetic markers, electromagnetic sensors, and the like. Further, the display computational unit 106 is communicatively connected to the augmented reality visor 104 and the sensors 114. The display computational unit 106 projects a prestored image associated with the portion of the cockpit area in front of the augmented reality visor 104. The prestored image associated with the portion of the cockpit area is projected in front of the augmented reality visor 104 based on a distance between the aircraft crew member and the portion of the cockpit area. Furthermore, the display computational unit 106 superimposes the prestored image over the portion of the cockpit area viewed by the aircraft crew member. The superimposed prestored image being viewed by the aircraft crew member through the augmented reality visor 104 to identify one or more objects in the portion of the cockpit area during the vision obscured emergency. Example objects may be controls/switches/knobs/buttons on a panel of the cockpit area.

For the purpose of explanation, the portion of the aircraft may be considered as the panel in cockpit area and the object may be considered as the switch/knob/button/control. However, the portion may be any parts inside the aircraft and the object may be any component on the parts inside the aircraft.

For superimposing the prestored image on the cockpit of the aircraft, the prestored image may be aligned with edges of the panel in the cockpit area of the aircraft. For example, the prestored image may be aligned with edges of the panel using magnetic markers at diagonal ends of the cockpit. Other examples of the sensors used for alignment/orientation are electric field sensors and infrared camera. First, the edges of the panel are detected using the magnetic markers, electric field sensors and/or infrared camera. Then, the prestored image corresponding to the panel is selected and is aligned with the panel on the augmented reality visor 104.

In one embodiment, the prestored image may include an image with identifiers (e.g. name of the switches/knobs/buttons) and/or control information of the switch/knob/button. The identifiers and/or control information may enable the aircraft crew member to identify that which switch/knob/button performs which function. For example, if the switch/knob/button is assigned to turn on auto-pilot mode, then the prestored image include the name and/or control information of the switch/knob/button as "auto-pilot" indicated on the prestored image. Thus, enabling the aircraft crew member to identify this switch/knob/button among all other switches/knobs/buttons for turning on the auto-pilot mode of the aircraft.

The aircraft crew member may be navigated to the desired object in the portion of the cockpit area. For this purpose, the aviation mask 102 may include a pupil tracking unit 108.

The pupil tracking unit 108 may track pupil of the aircraft crew member. The tracking information may be then sent to the display computational unit 106. Upon receiving the tracking information, the display computational unit 106 may navigate the aircraft crew member through control commands displayed on the augmented reality visor 104 using the tracking information and the control command/procedural instructions selected by the aircraft crew member using an audio input device 112. In another embodiment, the aviation mask 102 may include thermal sensor for detecting location where the aircraft crew member is touching on the cockpit. For this purpose, the thermal sensor may sense heat of a part (e.g., finger tip) of the body of the aircraft crew member. The sensed heat is used to determine a location where the aircraft crew member is touching on the cockpit. Based on the determined location, the display computational unit 106 may navigate the aircraft crew member to the object. Example thermal sensor may be IR camera. In another embodiment, an electric field sensor may be used in place of thermal sensor. The electric field sensor may sense the electric field of the finger tip of the aircraft crew member. The sensed electric field may be used by the display computational unit 106 to navigate the aircraft crew member to the object (e.g., switch/knob/control/button).

In one example, the aircraft crew member may be navigated to the objects when the aircraft crew member is looking at a different switch/knob. The tracking information may be used to determine that the aircraft crew member is looking at the different switch/knob. For example, head position or eye position of the crew member is tracked for determining that the crew member is looking at which switch/knob. For example, the head movement may be tracked using inertial/tilt sensors. For navigating the aircraft crew member to the objects, the display computational unit 106 may interact with the audio input device 112, such as a microphone. The audio input device 112 may be provided to enable the aircraft crew member to input an audio command for selecting the control command, such as procedural instructions having steps to be followed during the vision obscured emergencies. In one example, the control command/procedural instruction may be stepwise scrolled and/or read out using voice or gesture interaction. In one embodiment, the display computational unit 106 overlays control commands on the augmented reality visor 104. In one embodiment, the aviation mask 102 may include an audio output device 116 which may communicate with the display computational unit 106 to read out the overlaid control commands. The crew member may select a control command from these control commands. The display computational unit 106 may utilize the control command selected by the aircraft crew member to navigate the aircraft crew member to the object corresponding to the control command. In one example, the display computational unit 106 may navigate the aircraft crew member to the switch/knob/button using a pointer (e.g., an arrow mark) pointing towards the switch/knob/button and/or a highlighter, for example a highlighted circle overlaid on the switch.

Further, in one embodiment, the display computational unit 106 may overlay information associated with aircraft's surroundings on the augmented reality visor 104. The information associated with the aircraft's surroundings may be obtained by sensors connected to an outer surface of the aircraft. Further, the display computational unit 106 may be operatively coupled to the flight management system 110. The flight management system 110 may send flight management information associated with the aircraft to the display computational unit 106. In some examples, the flight management information may include autopilot data, flight director information, flight path vector, boresight, Differential Global Positioning System (DGPS) or Global Positioning System (GPS) data, positioning data, aircraft speed, aircraft altitude, track to nearby airports, inertial navigation data data associated with configuration of the aircraft, and a frequency for radio communication with a ground-based flight control. The display computational unit 106 may display the flight management information on the augmented reality visor 104, thereby enabling the aircraft crew member to control the aircraft during the vision obscured emergency.

Figure 2:
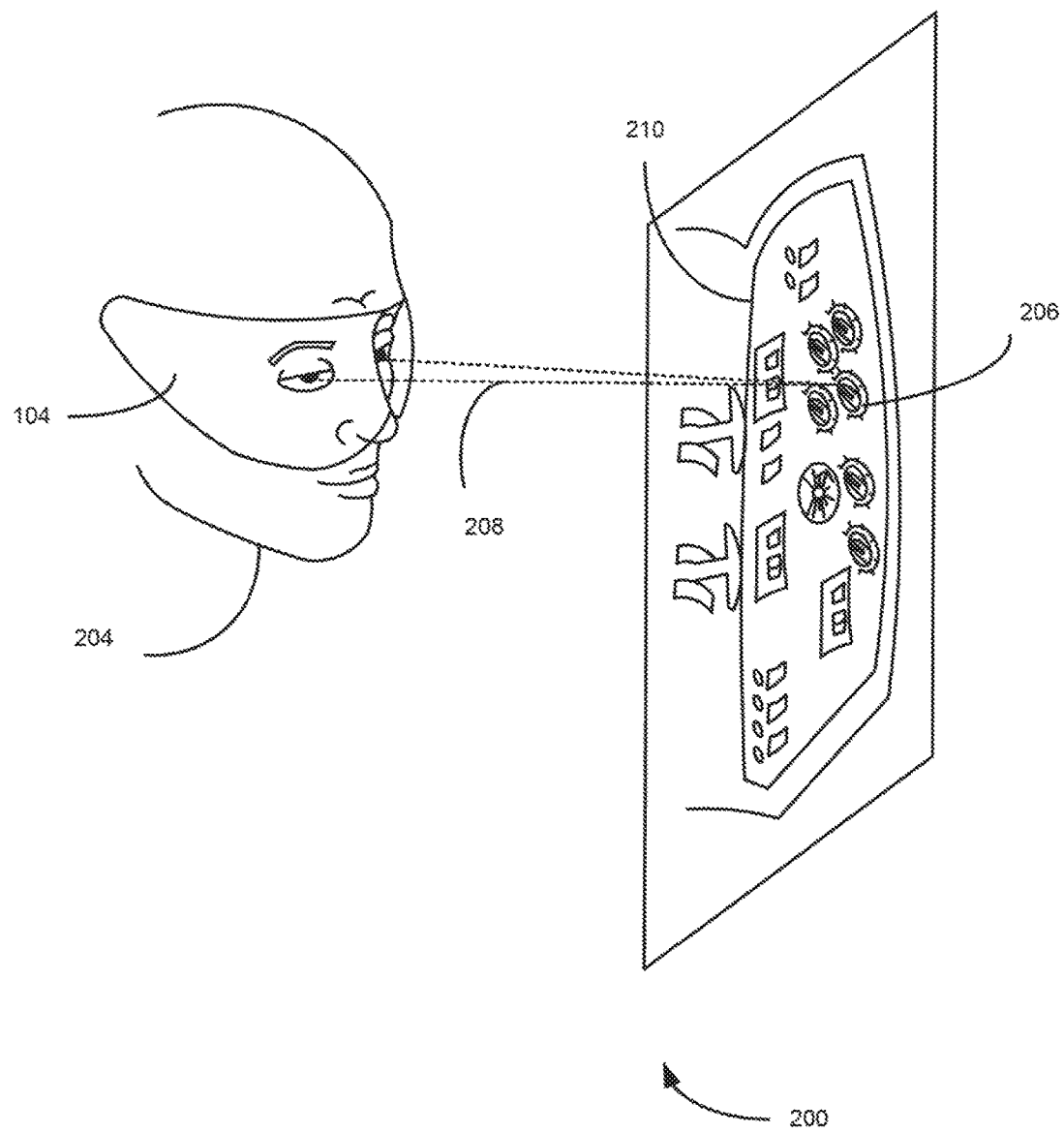
FIG. 2 is a perspective view of a pre-stored image of a control system located in a cockpit area seen by an aircraft crew member using the aviation mask during vision obscured emergency, in accordance with an embodiment.

Referring now to FIG. 2 which illustrates a perspective view 200 illustrating, the augmented reality visor 104, such as those shown in FIG. 1, for use by an aircraft crew member 204 in the cockpit area, in accordance with an embodiment. The augmented reality visor 104 enables the aircraft crew member 204 to see a switch 206 which the aircraft crew member 204 may want to activate. The augmented reality visor 104 may be associated with the display computational unit 106, such as those shown in FIG. 1, for collimating the prestored image 210 of the panel in the cockpit area. In one example, a pointer 208 or a highlighter, such as a circle shaped highlighted area may point towards the switch 206 in the prestored image 210 overlaid on the augmented reality visor 104 for navigating the aircraft crew member 204 to the switch 206. For example, the aircraft crew member 204 may be directed to the switch 206 using the control command selected by the aircraft crew member 204 using the microphone during the vision obscured emergency.

Figure 3:
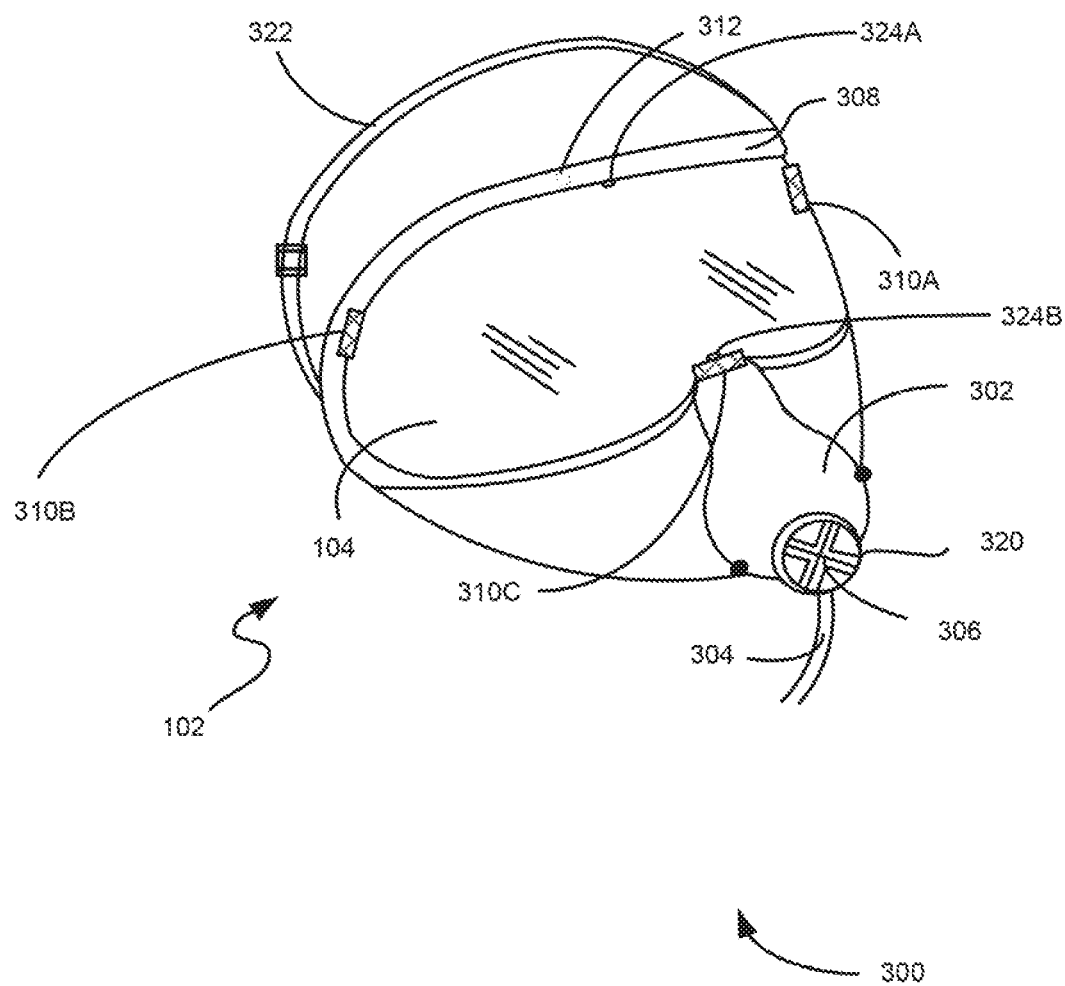
FIG. 3 is a perspective view of the aviation mask showing disposed locations of the components, such as those shown in FIGS. 1 and 2, in accordance with an embodiment.

Referring now to FIG. 3 which illustrates a perspective view 300 of the aviation mask 102 showing disposed locations of the components, such as those shown in FIGS. 1 and 2, in accordance with an embodiment. The aviation mask 102 may include a mouth and nose piece 302 connected to the augmented reality visor 104. The mouth and nose piece 302 may have smoke sensors for sensing presence of smoke in a cockpit of the aircraft. The smoke sensors may be mounted, for example, around the mouth and nose piece 302. For example, the smoke sensors may be mounted on the regulator 320. The smoke sensors are explained to be mounted on the regulator 320 for the purpose of explanation, however, may be mounted anywhere on the aviation mask 102 or may be mounted anywhere in the cockpit area for sensing the smoke in the cockpit. Further, the aviation mask 102 may include a respiratory gas inlet 304 and a respiratory gas outlet 306. The respiratory gas inlet 304 and a respiratory gas outlet 306 may be connected to the mouth and nose piece 302 for the purpose of inhaling the respiratory gas and exhaling the exhaled gas respectively.

Further, the aviation mask 102 may include a peripheral face seal 308. The peripheral face seal 308 may be fitted to the augmented reality visor 104. The augmented reality visor 104 is removably attached to the aviation mask 102 with the help of coupling elements 310A, 310B, and 310C. Further, the peripheral face seal 308 enables to isolate or seal of the face of the aircraft crew member from the surrounding air for protecting the face from contaminates present in air of cockpit and heat generated by fumes or smoke. The peripheral face seal 308 may be made of for example, pliable/compliant materials. Furthermore, the peripheral face seal 308 may include a demist sensor 312, disposed thereon, for sensing the mist on the augmented reality visor 104. The demist sensor 312 may be communicatively coupled to the regulator 320 for providing a feedback to the regulator 320 that there is a mist on the visor 104 and hence demisting is needed. The regulator 320, upon receiving the feedback, may perform demisting to clear mist in the augmented reality visor 104 by opening two valves 324A and 324B. One valve 324A is located, for example, on the upper portion of the face seal 308 and the other valve 324B is located on the mouth and nose piece 302. The valve 324B is connected to the regulator 320 to increase ventilation flow. The valve 324B allows oxygen/respiratory gas in and the other valve 324A allows the air with moisture out when opened. Also, the regulator 320 may be electronically coupled to the smoke sensor. The regulator may receive output from the smoke sensor and supply a respiratory gas to the aircraft crew member based on the output of the smoke sensor. The respiratory gas may be supplied to the aircraft crew member via the mouth and nose piece 302. In one example, the respiratory gas may be oxygen.

In one embodiment, the aviation mask 102 may also include a clamping mechanism 322 for facilitating the aircraft crew member to wear the aviation mask 102. The clamping mechanism 322, for example, may be straps connected to each other in such a manner that they can be utilized for wearing the aviation mask 102. In one example, the clamping mechanism 322 may be an adjustable strap or band which can be fitted around the head of the aircraft crew member to wear the aviation mask 102.

Figure 4:
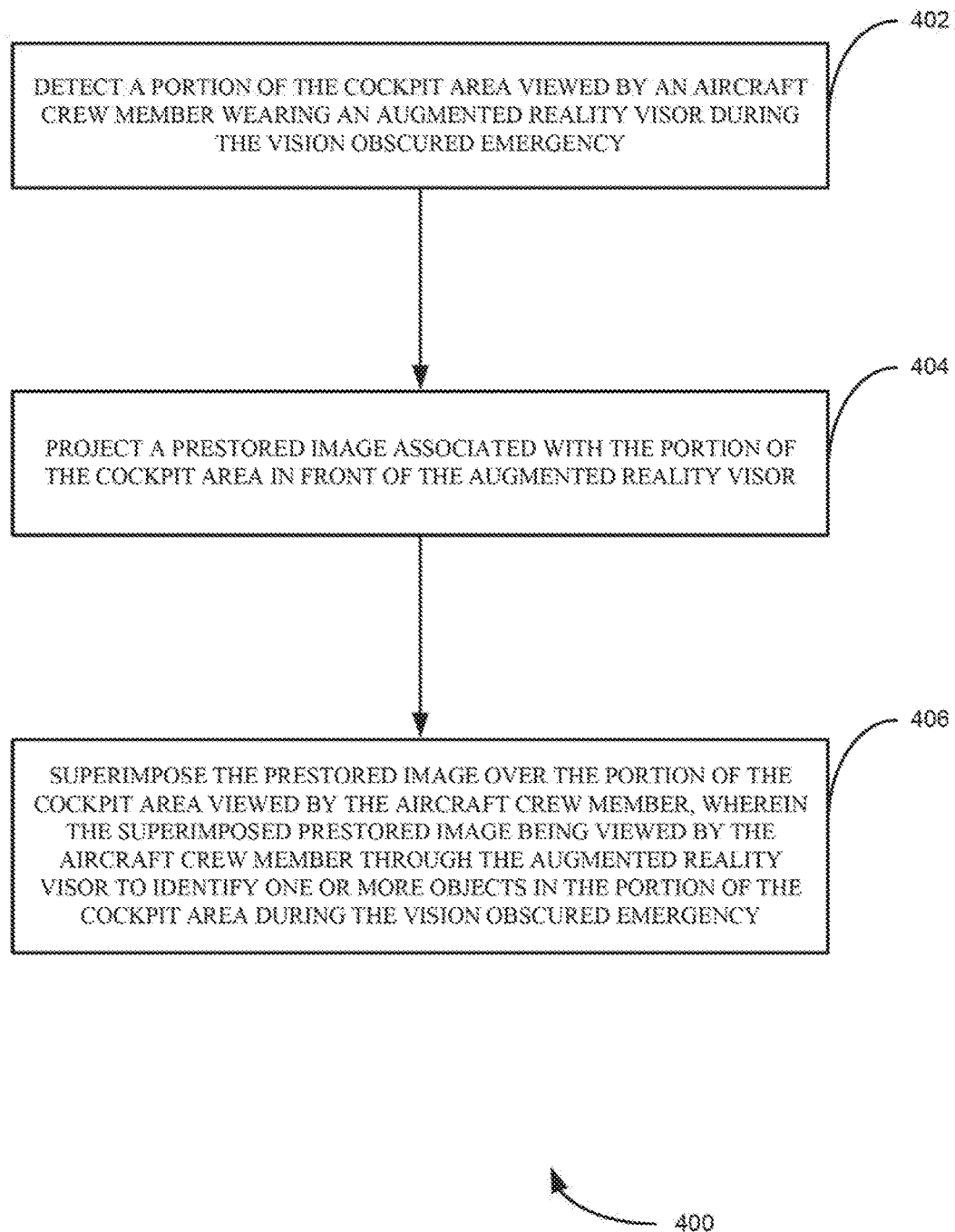
FIG. 4 is an example flow chart of a process for identifying objects inside the aircraft during a vision obscured emergency.

FIG. 4 depicts an example flow chart 400 of a process for identifying objects inside an aircraft during a vision obscured emergency. At block 402, a portion of the cockpit area viewed by an aircraft crew member wearing an augmented reality visor during the vision obscured emergency may be detected. The portion may refer to control panels, along with other components, located in the cockpit area of the aircraft. At block 404, a prestored image associated with the portion of the cockpit area may be collimated/projected in front of the augmented reality visor. At block 406, the prestored image may be superimposed over the portion of the cockpit area viewed by the aircraft crew member. The superimposed prestored image being viewed by the aircraft crew member through the augmented reality visor, which enables the aircraft crew member to identify one or more objects in the portion of the cockpit area during the vision obscured emergency. Example objects may be switches/knobs/buttons on a panel of the cockpit area.

Even though the above embodiments are explained with reference to an aviation mask for use in an aircraft during vision obscured emergencies, one can envision that the aviation mask can be used by crew in submarines, nuclear plants and the like during vision obscured emergencies.

Although certain methods, systems, apparatus, and articles of manufacture have been described herein, the scope of coverage of this patent is not limited thereto. To the contrary, this patent covers all methods, apparatus, and articles of manufacture fairly failing within the scope of the appended claims either literally or under the doctrine of equivalents.

What is claimed is:

1. An aviation mask comprising:
    an augmented reality visor;
    at least one sensor communicatively connected to the augmented reality visor, wherein the at least one sensor detects a portion of a cockpit area of an aircraft that is viewed by an aircraft crew member wearing the augmented reality visor during a vision obscured emergency; and
    a display computational unit communicatively connected to the augmented reality visor and the at least one sensor, wherein the display computational unit adapted to:

project a prestored image associated with the portion of the cockpit area in front of the augmented reality visor, wherein the prestored image comprises an image of the portion of the aircraft with identifiers and control information of one or more objects in the portion of the cockpit area; and superimpose the prestored image over the portion of the cockpit area viewed by the aircraft crew member, wherein the superimposed prestored image being viewed by the aircraft crew member through the augmented reality visor to identify the one or more objects in the portion of the cockpit area during the vision obscured emergency.

2. The aviation mask of claim 1, wherein the portion of the aircraft comprises at least one control on a control panel in the cockpit area of the aircraft.

3. The aviation mask of claim 1, wherein the display computational unit superimposes the prestored image over the portion of the cockpit area viewed by the aircraft crew member by:
detecting edges of the portion of the cockpit area using the at least one sensor; and
aligning the projected prestored image of the portion of the cockpit area over the portion of the cockpit area viewed by the aircraft crew member.

4. The aviation mask of claim 1, wherein the display computational unit overlays a plurality of control commands or procedural instructions on the augmented reality visor to enable the aircraft crew member to select one or more control commands or a procedural instruction.

5. The aviation mask of claim 4, further comprising:
a pupil tracking unit to track pupil of the aircraft crew member, wherein the display computational unit enables the aircraft crew member to navigate through the control commands displayed on the augmented reality visor based on the tracking information and the one or more control commands or the procedural instruction selected by the aircraft crew member.

6. The aviation mask of claim 4, further comprising:
at least one sensor to track head position or eye position of the aircraft crew member, wherein the display computational unit enables the aircraft crew member to select a cockpit control and provides directions to the aircraft crew member to navigate to the selected cockpit control based on the head position or the eye position.

7. The aviation mask of claim 4, further comprising:
an audio input device to enable the aircraft crew member to select one or more control commands or the procedural instruction.

8. The aviation mask of claim 4, further comprising:
an audio output device to read out the plurality of the control commands or the procedural instructions.

9. The aviation mask of claim 1, wherein the display computational unit is operatively coupled to a flight management system and configured to:
display flight management information on the augmented reality visor for enabling the aircraft crew member to control the aircraft during the vision obscured emergency.

10. The aviation mask of claim 9, wherein the flight management information comprises at least one of autopilot data, flight director information, flight path vector, boresight, Differential Global Positioning System (DGPS) or Global Positioning System (GPS) data, positioning data, aircraft speed, aircraft altitude, track to nearby airports, inertial navigation data, data associated with configuration of the aircraft, and a frequency for radio or text communication with a ground-based flight control.

11. The aviation mask of claim 1, wherein the display computational unit is further configured to:
display information associated with aircraft's surroundings on a portion of the augmented reality visor, wherein the information associated with the aircraft's surroundings is obtained from at least one sensor connected to an outer surface of the aircraft.

12. The aviation mask of claim 1, further comprising:
a smoke sensor for sensing smoke in the cockpit of the aircraft and providing an output signal;
a mouth and nose piece connected to the augmented reality visor, and
a regulator connected to the mouth and nose piece and electronically coupled to the smoke sensor for automatically supplying a respiratory gas to the aircraft crew member through the mouth and nose piece based on the output signal from the smoke sensor, wherein the respiratory gas comprises oxygen.

13. The aviation mask of claim 12, further comprising:
a first valve and a second valve connected to the regulator to enable demisting around the augmented reality visor using the respiratory gas, wherein the first valve is connected to the mouth and nose piece and the second valve is connected to a face seal.

14. A method for identifying objects inside a cockpit area of an aircraft during a vision obscured emergency, comprising:
detecting a portion of the cockpit area viewed by an aircraft crew member wearing an augmented reality visor during the vision obscured emergency;
projecting a prestored image associated with the portion of the cockpit area in front of the augmented reality visor, wherein the prestored image comprises an image of the portion of the aircraft with identifiers and control information of one or more objects in the portion of the cockpit area; and
superimposing the prestored image over the portion of the cockpit area viewed by the aircraft crew member, wherein the superimposed prestored image being viewed by the aircraft crew member through the augmented reality visor to identify the one or more objects in the portion of the cockpit area during the vision obscured emergency.

15. The method of claim 14, wherein projecting a prestored image associated with the portion of the cockpit area in front of the augmented reality visor is based on a distance between the aircraft crew member and the portion of the cockpit area.

16. The method of claim 14, wherein the portion of the cockpit area comprises at least one control on a control panel in the cockpit area of the aircraft.

17. The method of claim 14, wherein the prestored image comprises an image of the at least one control on the cockpit area of the aircraft along with identifiers and/or functional information of the at least one control.

18. The method of claim 14, wherein superimposing the prestored image over the portion of the cockpit area viewed by the aircraft crew member, comprising:
detecting edges of the portion of the cockpit area using the at least one sensor; and
aligning the projected prestored image of the portion of the cockpit area over the portion of the cockpit area viewed by the aircraft crew member.

19. The method of claim 18, further comprising:
tracking pupil of the aircraft crew member to navigate the aircraft crew member through the control commands overlaid on the augmented reality visor based on the tracking information and the one or more control commands or the procedural instruction selected by the aircraft crew member.

20. The method of claim 18, further comprising:
reading out the plurality of overlaid control commands or the procedural instructions using an audio output device.

21. The method of claim 14, further comprising:
overlaying a plurality of control commands or procedural instructions on the augmented reality visor to enable the aircraft crew member to select one or more control commands or a procedural instruction.

* * * * *